United States Patent Office
2,899,412
Patented Aug. 11, 1959

2,899,412

POLYSULFONE RESINS FROM BICYCLOHEPTENE DERIVATIVES AND SULFUR DIOXIDE

John R. Caldwell and Edward H. Hill, Kingsport, Tenn., assignors to Eastman Kodak Company, Rochester, N.Y., a corporation of New Jersey No Drawing. Application May 19, 1958
Serial No. 735,926

12 Claims. (Cl. 260—79.3)

This invention relates to resinous polysulfones and more particularly to resinous polysulfones from bicyclo-(2.2.1)hept-5-ene and from derivatives thereof with sulfur dioxide.

It is known that sulfur dioxide will add to unsaturated monomers containing an olefinic linkage represented, for example, by olefins such as ethylene, propene, isobutylene, 2-butene, 2-pentene, 2-hexene, cyclohexene, etc. and by vinyl monomers such as vinyl chloride, allyl chloride, methyl acrylate, methyl methacrylate, styrene, methyl vinyl ketone, etc., to give high molecular weight resins. However, on exposure to high temperatures as in molding operations, such known resins have had only limited utility because they decompose with the evolution of sulfur dioxide, unsaturated compounds and other decomposition products having unpleasant odors. The residual polymer turns black and expands into a voluminous, porous mass. Many additives have been proposed as stabilizing agents to cure this deficiency in hitherto known polysulfone polymers. These additives or processes for stabilization have not been altogether satisfactory from a commercial standpoint. We have now found that polysulfone resins which are inherently stable to high temperatures and many of which have softening points of 300° C. or more which is higher than any polysulfone resin reported previously, can be prepared from bicyclo-(2.2.1)hept-5-ene and certain of its derivatives with sulfur dioxide. This can be clearly seen from a comparison of the softening points of the polysulfone resin prepared according to the invention from bicyclo(2.2.1)hept-5-ene and sulfur dioxide (280° C.) and that prepared according to D. S. Frederick et al., J. Am. Chem. Soc., 56, page 1815 (1915) from cyclohexene and sulfur dioxide (200° C.). The polysulfone resins of the invention are valuable materials for preparing thermally stable films, fibers and molded articles.

It is, accordingly, an object of the invention to provide a new class of polysulfone resins which are very stable thermally. Another object is to provide novel polysulfone resins containing bicyclo(2.2.1)hept-5-ene or its derivatives. Another object is to provide thermally stable films, fibers and molded articles from the new class of polysulfone resins. Another object is to provide a process for preparing the said new class of polysulfone resins. Other objects will become apparent hereinafter.

In accordance with the invention, we prepare our new class of polysulfone resins by polymerizing, i.e. contacting at a temperature of —30° to +50° C., but preferably —10° to +30° C., a bicycloheptene derivative represented by the following general formula:

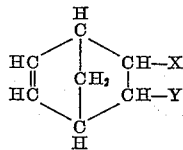

wherein X and Y each represents a hydrogen atom, a halogen atom such as chlorine or bromine, an alkyl group containing from 1–8 carbon atoms e.g. methyl, ethyl, propyl, butyl, hexyl, 2-ethylhexyl, etc. groups, a cycloalkyl group such as cyclopentyl or cyclohexyl groups, a hydroxyalkyl group wherein the alkyl group contains 1–4 carbon atoms such as hydroxymethyl, β-hydroxyethyl, γ-hydroxypropyl etc. groups, a phenyl group, a tolyl group, an —OH group, a —COOH group, a —COOR group, an —OCOR group, an —NH₂ group, an —NHR group, an —NRR group, etc., wherein in each instance above R represents an alkyl group of 1–4 carbon atoms, or X and Y together represent an imide grouping, a substituted imide grouping or an anhydride grouping, with at least an equimolar proportion of sulfur dioxide in the presence of one or more oxygen yielding peroxides, for example, hydrogen polymerization catalysts such as hydrogen peroxide, benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, perborates e.g. alkali metal perborates such as those of sodium and potassium, etc., persulfates e.g. ammonium persulfate and alkali metal persulfates such as sodium and potassium, etc., or other oxygen yielding polymerization catalysts such as an alkali metal nitrate, for example, lithium nitrate, etc., until a resinous polysulfone consisting of approximately equimolar proportions of the bicycloheptane derivative and sulfur dioxide is obtained. The polysulfone product can then be isolated, washed and dried by conventional methods. Advantageously, the sulfur dioxide can be employed in excess, for example as much as 2–3 moles of the sulfur dioxide per mole of the bicycloheptene derivative. Mixtures in any proportions of two or more of the mentioned bicycloheptene derivatives can be used, if desired, but preferably from 5 to 95 mole percent of a particular bicycloheptene derivative with from 95 to 5 mole percent of another bicycloheptene derivative. Although the polymerization reaction can be carried out at low temperatures in excess sulfur dioxide, a particularly useful method is to carry out the reaction in an inert solvent medium which is capable of dissolving relatively large amounts of sulfur dioxide at room temperatures for example in water, in a lower alkanol such as methanol, ethanol, isopropanol, etc., a mixture of alcohol and water, dimethylformamide, dimethyl-acetamide, etc. By using such solvent medium, the polymerization can be performed at normal atmospheric pressures. However, good results are also obtained at lower or higher than atmospheric pressures. Where water is employed as the inert medium, an emulsifying agent such as an alkali metal salts of certain alkyl acid sulfates, e.g. sodium lauryl sulfate, can advantageously be employed. The concentration of the polymerization catalyst can vary from 0.1–2.0% or more, based on the total weight of the bicycloheptene derivative and the sulfur dioxide.

Suitable bicycloheptene derivatives coming within the invention represented by the above general formula include bicyclo(2.2.1)hept-5-ene, bicyclo(2.2.1)hept-5-ene-2-carbonitrile, bicyclo(2.2.1)hept-5-ene-2-carboxylic acid, bicyclo(2.2.1)hept-5-ene-2,3-dicarboxylic acid, the methyl, ethyl, propyl, butyl, isobutyl, hexyl, 2-ethylhexyl, etc. esters of the above mono-and dicarboxylic acids, the anhydride of bicyclo(2.2.1)hept-5-ene-2,3-dicarboxylic acid, bicyclo(2.2.1)hept-5-ene-2-ol acetate, bicyclo-(2.2.1)hept-5-ene-2-ol acetate, bicyclo(2.2.1)hept-5-ene-2,3-dicarboxylic 2-ethylhexyl ester, bicyclo (2.2.1)hept-5-ene-2-ol, and the like.

The following examples will serve to illustrate further the manner whereby we practice our invention.

EXAMPLE 1

18.8 g. (0.2) of bicyclo(2.2.1)hept-5-ene, 150 cc. acetone, and 0.2 g. hydrogen peroxide were placed in a bottle and cooled to —20°. To this was added 12.8 g. (0.2 mole) of liquid sulfur dioxide. The bottle was capped and allowed to stand at room temperature for 18 hours. A white, powdery resin was obtained weighing 25 g. This polymer was soluble in chloroform and dimethylformamide. A film cast from chloroform had a hot bar sticking point of 280–290° C. It was thermally very stable.

EXAMPLE 2

The following materials were placed in a bottle and chilled to —20° C.

11.7 g. (0.1 mole) of bicyclo(2.2.1)hept-5-ene-2-carbonitrile
30 cc. water
0.1 g. lithium nitrate
0.1 g. lauryl alcohol sulfate When chilled, 6.4 g. (0.1 mole) of sulfur dioxide was added. The bottle was then caped and tumbled at +30° for 24 hours. A yield of 10 g. of polymer was obtained. Films of this polymer had a sticking point of 275–280° C. and had excellent thermal stability.

EXAMPLE 3

The following materials were placed in a flask which was immersed in an ethylene glycol-water bath at —20° C.

300 g. (0.2 mole) of bicyclo(2.2.1)hept-5-ene-2-carboxylic acid, methyl ester
128 g. (0.2 mole) of sulfur dioxide
2,000 cc. of isopropyl alcohol
3 g. ascaridol The reaction was stirred at —20° for 18 hours. A grainy, white polymer was isolated weighing 275 g. This polymer could be injection molded to produce clear colorless, hard objects at an extrusion temperature of 220° C.

EXAMPLE 4

The following materials were placed in a chilled bottle:

30 g. (0.2 mole) of bicyclo(2.2.1)hept-5-ene-2-ol, acetate
12 g. (0.2 mole) of sulfur dioxide
100 cc. water
0.3 g. lithium nitrate
0.3 g. lauryl alcohol sulfate The bottle was tumbled at 50° C. for 12 hours. A hard lump was obtained which was broken up, washed, and dried. The yield of polymer was 30 g. The polymer was soluble in chloroform, dimethylformamide, and tetraochloroethane. It had a sticking point of 240° C. and was thermally very stable.

EXAMPLE 5

The following materials were placed in a chilled bottle:

132.8 bicyclo(2.2.1)hept-5-ene-2-carboxylic acid
20 g. sulfur dioxide
0.1 g. cumene hydroperoxide The bottle was capped and tumbled at room temperature for eight hours. A viscous, colorless dope was formed. The bottle was then cooled to —20° C. and opened. The polymer was precipitated by pouring the dope into cold isopropyl alcohol. It weighed 18.5 g. It was thermally stable.

EXAMPLE 6

The following materials were placed in a chilled bottle:

7.4 g. bicyclo(2.2.1)hept-5-ene
8.1 g. bicyclo(2.2.1)hept-5-ene-2,3-dicarboxylic acid, 2-ethylhexyl ester
10 g. sulfur dioxide
0.2 g. acetyl peroxide The bottle was capped and allowed to stand at room temperature for 24 hours. A white powder weighing 13 g. was obtained. This polymer was soluble in acetonitrile and could be dry spun from this solvent to give a lustrous yarn with a sticking point of 210°. The yarn was thermally very stable.

EXAMPLE 7

The following materials were placed in a chilled flask:

147 g. bicyclo(2.2.1)hept-5-ene-2,3-dicarboxylic acid, isobutyl ester
94 g. bicyclo(2.2.1)hept-5-ene-2-carbonitrile
150 g. sulfur dioxide
2,000 cc. dimethylformamide
3 g. p-chlorobenzoylperoxide The reaction was stirred at room temperature for 12 hours. The polymer was isolated by pouring the reaction mixture into ispropyl alcohol. A yield of 300 g. was obtained. The polymer could be injection molded to form hard, clear objects. It was thermally very stable.

The remarkable thermal stability of our new class of polysulfone resins in comparison with prior art polysulfone resins can be seen from the following tables of thermal tests. Table I shows a typical prior art polysulfone resin prepared according to R. J. Fanning and R. P. Louthan, U.S. Patent No. 2,742,447, dated April 17, 1956, wherein the resin with and without added stabilizers was subjected to 375° F. for several time intervals. The figures in Table I are reproduced from the patent.

*Table I*

| Stabilizer | Percent loss in weight at end of x hours heating at 375+2° F. | | |
|---|---|---|---|
|  | 0.5 | 1 | 3 |
| Control | 12.8 | 18.3 | 30.5 |
| 2 wt. percent 2-benzimidazolethiol | 3.5 | 15.2 | 25.1 |
| 1 wt. percent 5-methyl-2-benzimidazolethiol | 3.0 | 12.0 | 19.8 |
| 1 wt. percent 5-chloro-2-benzimidazolethiol | 1. | 3.8 | 14.8 |

The following Table II shows two resins prepared from bicycloheptene derivatives according to the invention, wherein the resins were subjected to the same thermal test as that of the resins of Table I, but in the absence of any stabilizer.

*Table II*

| Composition of Polymer | Percent loss in weight at end of x hours heating at 375–380° F. | | |
|---|---|---|---|
|  | 0.5 | 1 | 3 |
| bicyclo(2.2.1)hept-5-ene-2-sulfur dioxide (Example 2) | 2.2 | 3.8 | 5.4 |
| bicyclo(2.2.1)hept-5-ene-2-carboxylic acid, methyl ester-sulfur dioxide (Example 3) | 1.9 | 5.7 | 9.5 |

It is clearly evident from a consideration of above Tables I and II that the polysulfone resins of the invention are inherently much more stable than those previously reported.

Other species of generally similar polysulfone resins coming within the invention, can be readily prepared by following the procedures of the preceding examples with any other of the bicycloheptene derivatives mentioned as being suitable reactants with sulfur dioxide. As previously indicated the polysulfone resins of the invention are all soluble in one or more organic solvents such as chloroform, dimethylformamide, tetrachloroethane, etc. some of which solutions can be spun into clear fibers or films having relatively very high softening points and unusually good thermal stability. Such films are useful as photographic film supports. The polysulfone resins of the invention are also thermoplastic and can be readily molded into shaped articles by injection and compression molding techniques. If desired, other materials can also be incorporated into the polysulfone resins of the invention such as dyes, fillers, plasticizers, etc.

What we claim is:

1. A polysulfone resin of sulfur dioxide and at least one bicycloheptene derivative represented by the following general formula:

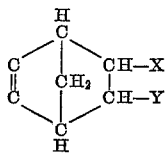

wherein X and Y each represents a member selected from the group consisting of a hydrogen atom, a chlorine atom, a bromine atom, an alkyl group of 1–8 carbon atoms, a cyclopentyl group, a cyclohexyl group, a hydroxyalkyl group of 1–4 carbon atoms, a phenyl group, a tolyl group, an —OH group, a —COOH group, a —COOR group, an —OCOR group, an —OR group, an —NH$_2$ group, an —NHR group and an —NRR, and wherein in each instance R represents an alkyl group of 1–4 carbon atoms, and wherein the total molar amount of the said bicycloheptene derivative is equal to the molar amount of the said sulfur dioxide.

2. A polysulfone resin of equimolar proportions of sulfur dioxide and bicyclo(2.2.1)hept-5-ene.

3. A polysulfone resin of equimolar proportions of sulfur dioxide and bicyclo(2.2.1)hept-5-ene-2-carbonitrile.

4. A polysulfone resin of equimolar proportions of sulfur dioxide and bicyclo(2.2.1)hept-5-ene-2-carboxylic acid, methyl ester.

5. A polysulfone resin of equimolar proportions of sulfur dioxide and bicyclo(2.2.1)hept-5-ene-2-ol, acetate.

6. A polysulfone resin of equimolar proportions of sulfur dioxide and a mixture of from 5 to 95 mole percent of bicyclo(2.2.1)hept-5-ene and 95 to 5 mole percent of bicyclo(2.2.1)hept-5-ene-2,3-dicarboxylic acid, 2-ethylhexyl ester.

7. A process for preparing a polysulfone resin which comprises contacting sulfur dioxide with a bicycloheptene derivative represented by the following general formula:

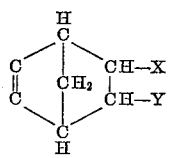

wherein X and Y each represents a member selected from the group consisting of a hydrogen atom, a chlorine atom, a bromine atom, an alkyl group of 1–8 carbon atoms, a cyclopentyl group, a cyclohexyl group, a hydroxyalkyl group of 1–4 carbon atoms, a phenyl group, a tolyl group, an —OH group, a —COOH group, a —COOR group, an —OCOR group, an —OR group, an —NH$_2$ group, an —NHR group and an —NRR, and wherein each instance R represents an alkyl group of 1–4 carbon atoms, in the proportions of at least one mole of the sulfur dioxide to each mole of the said bicycloheptene derivative, at a temperature of from —30° to +50° C., in the presence of an oxygen yielding polymerization catalyst.

8. The process of claim 7, wherein the said bicycloheptene derivative is bicyclo(2.2.1)hept-5-ene.

9. The process of claim 7 wherein the said bicycloheptene derivative is bicyclo(2.2.1)hept-5-ene-2-carbonitrile.

10. The process of claim 7 wherein the said bicycloheptene derivative is bicyclo(2.2.1)hept-5-ene-2-carboxylic acid, methyl ester.

11. The process of claim 7 wherein the said bicycloheptene derivative is bicyclo (2.2.1)hept-5-ene-2-ol, acetate.

12. The process of claim 7 wherein the said bicycloheptene derivative is a mixture of from 5 to 95 mole percent of bicyclo (2.2.1)hept-5-ene and 95 to 5 mole percent of bicyclo(2.2.1)hept-5-ene-2,3-dicarboxylic acid, 2-ethylhexyl ester.

No references cited.